United States Patent [19]

Eichenauer et al.

[11] Patent Number: 4,668,737
[45] Date of Patent: May 26, 1987

[54] GRAFT POLYMERS HAVING A MAT SURFACE

[75] Inventors: Herbert Eichenauer, Dormagen; Karl Zabrocki, Buettgen; Joachim Döring, Cologne; Karl-Heinz Ott, Leverkusen; Ludwig Bottenbruch, Krefeld, all of Fed. Rep. of Germany

[73] Assignee: Bayer Aktiengesellschaft, Leverkusen, Fed. Rep. of Germany

[21] Appl. No.: 739,142

[22] Filed: May 30, 1985

[30] Foreign Application Priority Data

Jun. 8, 1984 [DE] Fed. Rep. of Germany ....... 3421353

[51] Int. Cl.$^4$ ...................... C08F 279/02; C08L 51/04
[52] U.S. Cl. ......................................... 525/73; 525/77; 525/78; 525/279; 525/281; 525/291; 525/293; 525/301
[58] Field of Search ............... 525/279, 293, 301, 291, 525/73, 77, 78, 281

[56] References Cited

U.S. PATENT DOCUMENTS 2,991,258  7/1961  Haward et al. .................... 525/279
3,378,605  4/1968  Baer ................................... 525/279
3,683,049  8/1972  Kaku et al. ......................... 525/293
3,819,765  6/1974  O'Shea ............................... 525/279
4,504,625  3/1985  Kitsunai et al. ..................... 525/73
4,592,960  6/1986  Inoue et al. ......................... 428/461

FOREIGN PATENT DOCUMENTS 49-20075  5/1974  Japan ................................ 525/301
51-49226  4/1976  Japan ................................ 525/293

Primary Examiner—Wilbert J. Briggs, Sr.
Attorney, Agent, or Firm—Connolly & Hutz

[57] ABSTRACT

A graft product of from 40 to 99.8 parts by weight of styrene, α-methyl styrene, p-methyl styrene, vinyl toluene, methyl methacrylate or mixtures thereof, from 20 to 0.1 part by weight of a vinyl-group-containing, preferably heterocyclic nitrogen base, from 20 to 0.1 part by weight of a mono- or di-acid containing a polymerizable double bond and from 0 to 49 parts by weight of acrylonitrile on a particulate rubber having an average particle diameter ($d_{50}$) of from 0.05 to 20.0 μm and a glass temperature of $\leq 10°$ C., the total rubber content amounting to between 5 and 80% by weight.

9 Claims, No Drawings

GRAFT POLYMERS HAVING A MAT SURFACE

This invention relates to graft polymers having a mat surface in which monomers containing basic and acid functions are incorporated.

Polymer alloys having elastic-thermoplastic properties and a mat surface are of increasing interest for applications requiring extreme toughness combined with the absence of glare, for example for interior fittings for automobiles or for appliance and instrument casings of all kinds.

Hitherto, attempts have been made to produce polymer alloys of the type in question by using large rubber particles (cf. for example U.S. Pat. No. 4,169,869) or by using uncrosslinked or only slightly crosslinked rubbers (cf. for example DE-OS 20 57 936) as the graft base of the graft polymers.

In all these attempts, however, the desired surface finish is only obtained at the expense of other desired properties such as, for example, notched impact strength, hardness or processibility.

The present invention relates to mat graft products of from 40 to 99.8 parts by weight of styrene, α-methyl styrene, p-methyl styrene, vinyl toluene, methyl methacrylate or mixtures thereof, from 20 to 0.1 part by weight of a vinyl-group-containing, preferably heterocyclic nitrogen base, from 20 to 0.1 part by weight of a mono- or di-acid containing a polymerizable double bond and from 0 to 49 parts by weight of acrylonitrile on a particulate rubber having an average particle diameter ($d_{50}$) of from 0.05 to 20.0 μm and a glass temperature of $\leq 10°$ C., the total rubber content amounting to between 5 and 80% by weight.

Virtually any rubber having a glass temperature of $\leq 10°$ C. may be used as the graft base. Examples of rubbers such as those are polybutadiene, polyisoprene, styrene-butadiene copolymers, acrylonitrile-butadiene copolymers, acrylate rubbers, EPM rubbers (ethylene-/propylene rubbers) and EPDM rubbers (ethylene-/propylene/diene rubbers containing a non-conjugated diene, such as for example 1,5-hexadiene or norbornadiene, in small quantities as the diene).

These rubbers must be present in the form of particles having an average diameter ($d_{50}$) of from 0.05 to 20.0 μm, preferably from 0.1 to 2.0 μm and, more preferably, from 0.1 to 0.8 μm.

Suitable graft monomers are, for example, styrene, α-methyl styrene, p-methyl styrene, vinyl toluene, acrylonitrile, methacrylonitrile, methyl methacrylate, vinyl acetate or mixtures thereof, more particularly mixtures of acrylonitrile with styrene. Suitable polymerizable nitrogen bases are, for example, 2-vinyl pyridine, 3-vinyl pyridine, 4-vinyl pyridine, N-vinyl imidazole, p-dimethylaminostyrene, 4-vinyl pyrimidine, N-vinyl carbazole, N-vinyl pyrrole, N-vinyl indole, dimethylaminoethyl methacrylate or mixtures thereof. Suitable polymerizable mono- or di-acids are, for example, acrylic acid, methacrylic acid, maleic acid, fumaric acid, itaconic acid, crotonic acid, cinnamic acid, vinyl sulfonic acid, vinyl benzene sulfonic acid and mixtures thereof, aliphatic $C_3$-$C_{10}$ or aromatic $C_9$-$C_{18}$ mono- or dicarboxylic acids being preferred.

The graft product may be produced in known manner by graft polymerization of the monomers in the presence of the rubber in emulsion, suspension or solution or by a combination of these methods.

The graft polymerization reaction is preferably carried out by polymerizing styrene, α-methyl styrene, p-methyl styrene, vinyl toluene, methyl methacrylate or mixtures thereof, optionally acrylonitrile, and a mono- or di-acid containing a polymerizable double bond during one phase of the reaction and styrene, α-methyl styrene, p-methyl styrene, vinyl toluene, methyl methacrylate or mixtures thereof, optionally acrylonitrile, and a vinyl-group-containing nitrogen base in any order during a second phase of the reaction in the presence of the graft base.

The graft product contains from 5 to 80% by weight and preferably from 20 to 60% by weight of rubber and has gel contents as measured in acetone at 25° C. of from 30 to 90% by weight and preferably from 40 to 80% by weight.

In the production of the graft product by emulsion polymerization, it is necessary to use emulsifiers or combinations of emulsifiers which are active both in acidic and also in basic medium.

Standard additives, such as antioxidants, antiagers, lubricants, flameproofing, agents, fillers, pigments, antistatic agents, may be added in the usual quantities to the graft product according to the invention.

The graft product according to the invention is a mat, flexible thermoplastic molding composition having good flow properties for processing by extrusion, calendering and injection molding. It may be processed into mat moldings, but is also suitable as a modifier for other plastics, particularly for thermoplasts, such as acrylonitrile/butadiene/styrene terpolymers (ABS), methyl methacrylate/butadiene/styrene terpolymers (MBS), styrene/acrylonitrile copolymers (SAN), α-methyl styrene/acrylonitrile copolymers, polystyrene, high-impact polystyrene (HIPS), polymethyl methacrylate, polyvinyl chloride, polycarbonate, polycarbonate/ABS mixtures, polyphenylene oxide, polyphenylene oxide-/HIPS mixtures, polyamides, for example polyamide-6, polyamide-66, polyesters, for example polyethylene terephthalate, polybutylene terephthalate. Graft products according to the invention having a high rubber content (approximately 50 to 70%) are preferably used as "matting modifiers". They are generally used in a quantity of from 5 to 40% by weight, based on the modified product as a whole.

One particularly preferred mixture of this type consists of from 10 to 80% by weight and preferably from 20 to 70% by weight of the mat graft product according to the invention and from 90 to 20% by weight and preferably from 80 to 30% by weight of a thermoplastic resin of from 5 to 40 parts by weight of acrylonitrile and from 95 to 60 parts by weight of styrene, α-methyl styrene, p-methyl styrene, methyl methacrylate or mixtures thereof.

These resins are known and are frequently referred to as SAN resins.

They may be combined with the graft product by mixing at elevated temperatures, more particularly at temperatures in the range from 100° C. to 280° C., for example in kneaders, on roll stands or in screw extruders. If the resin and graft product accumulate in the form of emulsions, suspensions or solutions, they may be mixed and worked up together in those forms.

EXAMPLES AND COMPARISON EXAMPLES

The following Examples illustrate the invention.

The parts quoted are parts by weight and are always based on solid constituents or polymerizable constituents.

PRODUCTION OF THE GRAFT PRODUCTS

In a reactor, G parts of rubber base (in the form of a latex having a solids content of from 35 to 50% by weight) are heated to 65° C., after which 0.5 part of potassium persulfate (dissolved in 20 parts of water) are added. Thereafter, first M (I) parts of the monomer mixture shown in Table 1 are added over a period of 2 hours in reaction phase I and then M (II) parts of the monomer mixture shown in Table 1 are added over a period of 2 hours in reaction phase II, as a result of which the grafting reaction takes place. At the same time, 2 parts of the sodium salt of a $C_9$–$C_{18}$ alkyl sulfonic acid mixture (dissolved in 25 parts of water) are added over a period of 4 hours. Following an after-reaction, the graft latex is coagulated in an aqueous magnesium sulfate/acetic acid solution after the addition of 1.2 parts of antioxidant. The resulting powder is washed with water and dried in vacuo at 70° C.

ment) and a coil (for assessing flow path). Notched impact strength was measured at room temperature ($a_k{}^{RT}$) and at $-40°$ C. ($a_k{}^{-40°\ C.}$) in accordance with DIN 53 453 (unit: $kJ/m^2$), ball indentation hardness ($H_c$) in accordance with DIN 53 456 (unit: $N/mm^2$), dimensional stability under heat (Vicat B) in accordance with DIN 53 460 (unit: °C.) and the flow path at 240° C. using a coil approx. 8 mm wide and approx. 2 mm thick (unit: cm). Gloss measurement was carried out in accordance with DIN 67 530 on a flat tile at a reflection angle of 60° (reflectometer value) by means of a Byk-Mallinckrodt Multi-Gloss multi-angle reflectometer (see Table 2).

The following thermoplast resins were used: styrene/acrylonitrile (SAN)=72:28 copolymer having an $M_w$ of approx. 80,000, α-methyl styrene/acrylonitrile (AMSAN)=69:31 copolymer having an $M_w$ of approx. 75,000, bisphenol-A polycarbonate (PC) having an $M_w$ of approx. 30,000.

All resin have a $(M_w/M_n) - 1$ value of $\leq 2.0$.

TABLE 2

| | | | Compositions and test data of the molding compositions | | | | | | | |
|---|---|---|---|---|---|---|---|---|---|---|
| Molding composition | Graft product | P [parts] | Thermoplastic resin | H [parts] | RT $a_k$ | −40° C. $a_k$ | $H_c$ | Flow Vicat B | ometer path | Reflectometer value |
| 1 (comparison) | 1 | 40 | SAN | 60 | 12.1 | 7.1 | 95 | 100 | 50 | 77 |
| 2 (comparison) | 2 | 40 | SAN | 60 | 11.8 | 7.0 | 88 | 97 | 48 | 75 |
| 3 (comparison) | 3 | 40 | SAN | 60 | 11.2 | 5.6 | 90 | 101 | 40 | 23 |
| 4 | 6 | 40 | SAN | 60 | 11.2 | 5.9 | 89 | 101 | 48 | 33 |
| 5 | 6 | 35 | AMSAN | 65 | 10.3 | 5.1 | 88 | 105 | 32 | 28 |
| 6 | 6 | 35 | PC/SAN = 2:1 mixture | 65 | 22.5 | 11 | 83 | 113 | 31 | 36 |

It can be seen from Table 2 that neither the mixing of

TABLE 1

| | | Composition of the graft products | | | | |
|---|---|---|---|---|---|---|
| Graft product | Rubber base | Average particle size | G [parts] | Monomer in reaction phases I | M (I) [parts] | Monomer in reaction phases II | M (II) [parts] |
| 1 (comparison) | polybutadiene latex | 0.25 μm | 50 | 72 styrene<br>28 acrylonitrile | 25 | 72 styrene<br>28 acrylonitrile | 25 |
| 2 (comparison) | polybutadiene latex | 0.25 μm | 50 | 67.7 styrene<br>26.3 acrylonitrile<br>6.0 2-vinylpyridine | 25 | 67.7 styrene<br>26.3 acrylonitrile<br>6.0 vinylpyridine | 25 |
| 3 (comparison) | polybutadiene latex | 0.25 μm | 50 | 67.7 styrene<br>26.3 acrylonitrile<br>6.0 methacrylic acid | 25 | 67.7 styrene<br>26.3 acrylonitrile<br>6.0 methacrylic acid | 25 |
| 4 | polybutadiene latex | 0.25 μm | 50 | 63.4 styrene<br>24.6 acrylonitrile<br>6.0 2-vinylpyridine<br>6.0 methacrylic acid | 25 | 63.4 styrene<br>24.6 acrylonitrile<br>6.0 2-vinylpyridine<br>6.0 methacrylic acid | 25 |
| 5 | polybutadiene latex | 0.25 μm | 50 | 63.4 styrene<br>24.6 acrylonitrile<br>12.0 2-vinylpyridine | 25 | 63.4 styrene<br>24.6 acrylonitrile<br>12.0 methacrylic acid | 25 |
| 6 | polybutadiene latex | 0.25 μm | 50 | 63.4 styrene<br>24.6 acrylonitrile<br>12.0 methacrylic acid | 25 | 63.4 styrene<br>24.6 acrylonitrile<br>12.0 2-vinylpyridine | 25 |
| 7 | polybutadiene latex | 0.25 μm | 50 | 54.7 styrene<br>21.3 acrylonitrile<br>24.0 methacrylic acid | 25 | 54.7 styrene<br>21.3 acrylonitrile<br>24.0 2-vinylpyridine | 25 |

PRODUCTION AND TESTING OF THE MOLDING COMPOSITIONS

B parts of the graft product are mixed in a kneader with H parts of a thermoplastic resin and 3 parts of a lubricant and the resulting mixture injection-molded to form standard small test bars, a tile (for surface assessa graft product which does not contain any basic or acidic monomer components in copolymerized form (molding composition 1), nor the introduction of a product grafted only with basic monomers (molding composition 2) into a thermoplastic matrix produces a mat surface. Although a mat surface is observed after the mixing of a graft product produced using monomers containing acid groups with the thermoplastic resin, there is at the same time a drastic reduction in flow (molding composition 3). It is only where the graft products according to the invention are used in a thermoplastic resin matrix (molding compositions 4 to 6) that a mat surface is obtained without any adverse effect upon the other properties.

We claim:

1. A graft product of from 50 to 99.8 parts by weight of styrene, α-methyl styrene, p-methyl styrene, vinyl toluene, methyl methacrylate or mixtures thereof, from 20 to 0.1 parts by weight of a vinyl-group-containing nitrogen base, from 20 to 0.1 parts by weight of a mono- or di-acid containing a polymerizable double bond and from 0 to 49 parts by weight acrylonitrile on a particulate rubber having an average particle diameter ($d_{50}$) of from 0.05 to 20.0μ and a glass termperature of $\leq 10°$ C., the total rubber content amounting to between 5 and 80% by weight.

2. A graft product of from 60 to 85 parts by weight of styrene, α-methyl styrene, p-methyl styrene, vinyl toluene, methyl methacrylate or mixtures thereof, from 15 to 1 parts by weight of a vinyl-group-containing nitrogen base, from 15 to 1 parts by weight of a mono- or di-acid containing a polymerizable double bond and from 10 to 40 parts by weight of acrylonitrile on a particulate rubber having an average particle diameter ($d_{50}$) of from 0.1 to 1.0μ and a glass temperature of $\leq 10°$ C., the total rubber content amounting to between 30 to 70% by weight.

3. A graft product as claimed in claim 1 containing 2-vinylpyridine or 4-vinylpyridine or a mixture thereof as the nitrogen base.

4. A graft product as claimed in claim 1 containing acrylic acid or methacrylic acid or a mixture thereof as the acid.

5. A mixture containing
from 10 to 80% by weight of the graft product claimed in claim 1 and
from 90 to 20% by weight of a thermoplastic resin of from 5 to 40 parts by weight of acrylonitrile and from 95 to 60 parts by weight of styrene, α-methyl styrene, p-methyl styrene, methyl methacrylate or mixtures thereof.

6. A process for producing the graft product claimed in claim 2, characterized in that, in one reaction phase, styrene, α-methyl styrene, p-methyl styrene, vinyl toluene, methyl methacylate, mixtures thereof, or mixtures with acrylonitrile and a mono- or di-acid containing a polymerizable double bond and, in a preceding or following further reaction phase, styrene, α-methyl styrene, p-methyl styrene, vinyl toluene, methyl methacrylate, mixtures thereof, or mixtures with acrylonitrile and a nitrogen base containing vinyl groups are polymerized in the presence of the particulate rubber.

7. A graft product as claimed in claim 1, wherein the nitrogen base is a heterocyclic nitrogen base.

8. A graft product as claimed in claim 2, wherein the nitrogen base is a heterocyclic nitrogen base.

9. A process for producing the graft product claimed in claim 1, characterized in that, in one reaction phase, styrene, α-methyl styrene, p-methyl styrene, vinyl toluene, methyl methacrylate or mixtures thereof and a mono- or di-acid containing a polymerizable double bond and, in a preceding or following further reaction phase, styrene, α-methyl styrene, p-methyl styrene, vinyl toluene, methyl methacrylate or mixtures thereof and a nitrogen base containing vinyl groups are polymerized in the presence of the particulate rubber.

* * * * *